United States Patent [19]

Soderquist

[11] Patent Number: 5,285,802

[45] Date of Patent: Feb. 15, 1994

[54] PORTABLE WHEELCHAIR CLEANING APPARATUS

[76] Inventor: Karl Soderquist, 110 Tirrell Hill Rd., Goffstown, N.H. 03045

[21] Appl. No.: 80,421

[22] Filed: Jun. 18, 1993

[51] Int. Cl.⁵ .............................................. B08B 3/02
[52] U.S. Cl. ................................. 134/123; 134/181; 134/200; 134/57 R; 134/183
[58] Field of Search ............... 134/172, 123, 181, 200, 134/180, 56 R, 58 R, 57 R, 182, 183

[56] References Cited

U.S. PATENT DOCUMENTS

| | | | |
|---|---|---|---|
| 2,981,266 | 4/1961 | Tamburri | 134/123 |
| 3,353,546 | 11/1967 | Mahoney | 134/123 |
| 3,368,572 | 2/1968 | Capra | 134/123 |
| 3,444,867 | 5/1969 | Thornton | 134/123 |
| 3,606,895 | 9/1971 | Brown | 134/56 R |
| 3,612,077 | 10/1971 | Capro | 134/181 |
| 3,658,590 | 4/1972 | Huebner | 134/123 X |
| 3,826,269 | 7/1974 | Garrison | 134/57 R |
| 4,275,263 | 7/1981 | Pulliam | 134/200 |
| 4,421,132 | 12/1983 | Kuhl | 134/123 |
| 5,133,375 | 7/1992 | Schinzing | 134/180 |

*Primary Examiner*—Frankie L. Stinson

[57] ABSTRACT

A wheelchair cleaning system includes, in a modular assembly, a wash chamber, operators control unit and a mobile base support structure housing the electromechanical components used to apply the cleaning process. The operator places a wheelchair in the wash chamber and from the control unit selects cleaning functions to be applied through a programmable microprocessor. A pump draws cleaning solution from the sink through a line connected to the rotating spray arm assembly. As the spray arm lifts past the wheelchair, the solution is sprayed against the wheelchair through nozzles on the spray arm. The solution returns into the sink for continuous re-cycling. A drain pump draws the contaminated water from the sink through a drain line into a drain receptacle when the wash and rinse cycles are completed.

8 Claims, 9 Drawing Sheets

PORTABLE WHEELCHAIR CLEANING APPARATUS

RELATED APPLICATIONS

Previous disclosure documents regarding the present invention were received by the U.S. Patent and Trademark Office on Dec. 21, 1992 for disclosure No. 322571 entitled "Portable Wheelchair Washer" and on Sep. 6, 1991 for disclosure No. 290638 entitled "Wheelchair Washer".

BACKGROUND

Wheelchairs must often be cleaned and disinfected when used daily in health care facilities. Dirt, food, blood, mucous, urine are typical substances that collect and build up on many parts of a wheelchair.

The construction of wheelchairs pose special problems when cleaning by hand. Various material types such as rubber, plastic, metal and vinyl, plus different sized parts and the number of inter-connecting pieces result in difficult areas to reach when cleaning.

Hand towels, scrub brushes, spray bottles, shower hoses are typical cleaning utensils that personnel use for hand cleaning. These cleaning utensils require personnel to have direct contact with the equipment when cleaning. With the increasing risk of infectious diseases that can be carried by medical equipment and the general avoidance of having direct contact with unpleasant odor and substances on the wheelchair, personnel tend to avoid thorough cleaning. These factors and conditions often lead to minimum frequency of cleaning and inconsistent quality.

General purpose pressure washers and steam cleaners are also used for wheelchair cleaning. Typically, wheelchairs are brought to special cleaning areas inside or outside a health care facility to accommodate the wide diffusing of water created by high pressure washing equipment.

While high pressure cleaning is very effective for thorough cleaning, it is disruptive to the wheelchair user since they have to be removed from the wheelchair during the day when this type of cleaning is typically scheduled and is disruptive to the facility as equipment must be transported by the staff to designated cleaning areas. High pressure cleaning typically uses very hot water and combined with pressure can dissolve grease in the wheel bearings when the spray is directed to the wheel area. Furthermore, hot water to steam temperatures used by steam cleaners and pressure washers are corrosive to metal tubing that are used in constructing wheelchairs. In addition, cleaning quality is dependent on the person using the equipment.

Cleaning outside also causes environmental concern since appropriate drains are not common in parking lots or driveways where cleaning is often done.

Therefore, what has been missing is a cleaning system for wheelchairs and potentially other durable medical equipment that provides the means for consistent cleaning quality, the convenience of cleaning wheelchairs where they are located, the use of chemicals for cleaning and disinfecting without direct contact and the automation of the cleaning process that reduces contact with the equipment and reduces personnel time to clean.

SUMMARY OF THE INVENTION

The present invention provides a cleaning apparatus which includes a removable wash chamber having a substantially enclosed interior region for enclosing articles being washed. The wash chamber is supported by a base. A spray arm is moveably secured to the base. The spray arm has nozzles for directing a spray of wash fluids upon the articles enclosed within the wash chamber. The spray arm is moveable so that the spray arm can move over the articles enclosed within the wash chamber to maximize the coverage of the spray of wash fluids over multiple surfaces of the articles.

In preferred embodiments, the spray arm includes a first radial arm having proximal and distal ends rotatably attached to the base at the proximal end of the first radial arm. A series of first nozzles for directing a spray of wash fluids in a first direction is positioned along the first arm. A second radial arm spaced apart from the first radial arm has proximal and distal ends and is rotatably attached to the base at the proximal end of the second radial arm. A series of second nozzles facing the series of first nozzles for directing a spray of wash fluid in the second direction is positioned along the second radial spray arm. The spray arm further includes a connecting arm which connects the first and second radial arms together. The connecting arm has a third series of nozzles positioned along the connecting arm to direct the spray of wash fluids in a third direction.

In preferred embodiments, the cleaning apparatus is a portable wheelchair cleaning system wherein a wheelchair is placed into the wash chamber and is thoroughly cleaned. The wheelchair cleaning system is comprised of a wash chamber and operators control unit mounted on a mobile base containing the electromechanical components for applying the wash and rinse functions.

The operators control unit and wash chamber are a modular assembly supported by the mobile base. A primary advantage resulting from the present invention is providing mobility for wheelchair cleaning in different locations of a health care facility. Using standard electrical and water supply outlets found throughout the facility, the cleaning system easily connects to these outlets and provides thorough cleaning with minimal direct contact of the equipment by personnel thereby increasing the likelihood of frequent wheelchair cleaning.

Prior to the present invention, personnel would expend significant amount of time transporting wheelchairs to cleaning areas located in different parts of the building or outside when thorough cleaning was scheduled. The embodiment of this invention provides for convenient thorough cleaning where the wheelchairs are located.

Cleaning functions are selected using a control panel located on the operators control unit. Cleaning functions include a short wash, long wash and a rinse function. In addition to the cleaning functions, disinfectant solution can be included into the rinse cycles and rinse additives that speed up the drying process.

Containers located in the control unit are used to hold concentrated cleaning detergents, disinfectants and rinse additives. A tubing line connects to a spigot at the bottom of the container and feeds into a valve that under program control releases a measured amount of liquid chemical into the sink during the wash and rinse cycles.

An advantage of the present invention is that the micro-processor controls dilution rate of chemicals used for cleaning. Personnel are free from directly handling concentrate chemicals. Of particular importance is the application of disinfecting. Current methods of using hand held spray containers to apply disinfectants to equipment often require the user to mix their own solution of disinfectants and water, and as result, may have dilutions that do not meet standards for disinfecting.

Measuring and controlling the dilution mixture for chemicals also provides for the optimum efficiency in cleaning results and controlling costs.

With the initiation of the cleaning selection, the water supply line is opened by a valve and hot water is released into a sink located in the base structure. Float level switches monitored by the programmable software determine the amount of water that will be used in the wash and rinse cycles. A measured amount of detergent is released into the sink through a valve in a line that is connected to the detergent solution container.

A wash pump draws the mixed solution in the sink through a line into a rotating spray arm assembly and out through spray nozzles located on the spray arm. The spray arm assembly surrounds the wheelchair on all four sides with nozzles on each of the four sides positioned to provide maximum coverage on areas of a wheelchair that often collect contaminants. As the spray arm assembly rotates past the wheelchair, the spray under pressure makes contact with all surfaces.

To provide maximum coverage of wheelchair surfaces, the spray arm pivots on one end by using a chain driven gear to turn the end spray arm that serves as a drive shaft.

Alternatively, another embodiment of the spray arm assembly are tracks on each side of the wash chamber with a spray arm assembly traveling back and forth using a gear motor. The use of hydraulic or pneumatic cylinders could also be used to move the spray arm assembly in various spray arm configurations.

Preferably, the rotating spray arm is positioned with spray nozzles that provide maximum surface coverage of the wheelchair and through water pressure dislodges contaminants collected on various parts of the wheelchair.

In the preferred embodiment of the rotating spray arm assembly, couplings are located on the spray arm to provide additional equipment cleaning by changing the spray arm design. Couplings located at the end of each spray arm can be disconnected so that the spray arms may be reconfigured to have spray arms rotate without interference of the cross piece when different shaped equipment is cleaned.

The preferred embodiment uses hot water commonly found in utility sinks or room sinks with a water temperature of not more than 120 degrees. Spray pressure produced by the wash pump is less than 100 PSI. These factors reduce the dissolving of grease on wheel bearings that typically occur with high pressure and very hot water in excess of 140 degrees. Wheelchairs are constantly in need of cleaning and the use of high pressure and very hot water on a continuous basis results in replacing wheel bearings due to grease being dissolved and the corrosive factors inherent with the use of very hot water.

A filter enclosure located in the sink is placed into the wash pump line to trap contaminants from entering the wash pump and subsequently clogging spray nozzles.

To remove contaminants lodged on the filter screen without direct user contact, the water supply line extends into the filter. When filling the sink with water for the wash and rinse cycles, water is sprayed against the inside of the filter screen forcing the collected contaminants on the outside of the filter screen into the sink to be sucked into the drain hole during the drain process.

The advantage of the present invention is the continuous cleaning of the filter thereby minimizing any direct contact by the user in handling contaminants as a result of the cleaning process.

In the preferred embodiment, the wash chamber is designed to be easily removed from the base structure when transporting the cleaning system from one facility to another using standard commercial vans. By removing the wash chamber off the base the overall height of the cleaning system is reduced to provide access into a commercial van.

Another benefit of the removable wash chamber is that no electromechanical parts used in the cleaning process are designed into the wash chamber. The wash chamber is simply an enclosure that mounts onto the base and therefore can be made out of various material for lightness, molding and transportability without regard to any connecting or mounting components used in the application of cleaning.

Construction of a wash chamber that is not dependent on any electromechanical components used for applying the cleaning process also provides for alternative sized wash chambers to accommodate other equipment.

Preferably, the micro-processor may be programmed to provide enhancements and updates to the system. For example, if new chemicals are introduced that require a change in dilution ratios, software changes can be made for valve opening time. Measuring and determining the amount of water for different types of equipment cleaning may be changed to accommodate equipment sizes. Incorporating a larger wash chamber may require a change in the spray arm movement from a zero (0) to ninety (90) degree spray patten to one hundred eighty (180) degree movement. Pressure and water flow rates may be measured to determine pump efficiency. Water temperature may be monitored.

BRIEF DESCRIPTION OF THE DRAWINGS

The foregoing and other drafts, features and advantages of the invention will be apparent from the following more particular descriptions of preferred embodiments of the invention as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
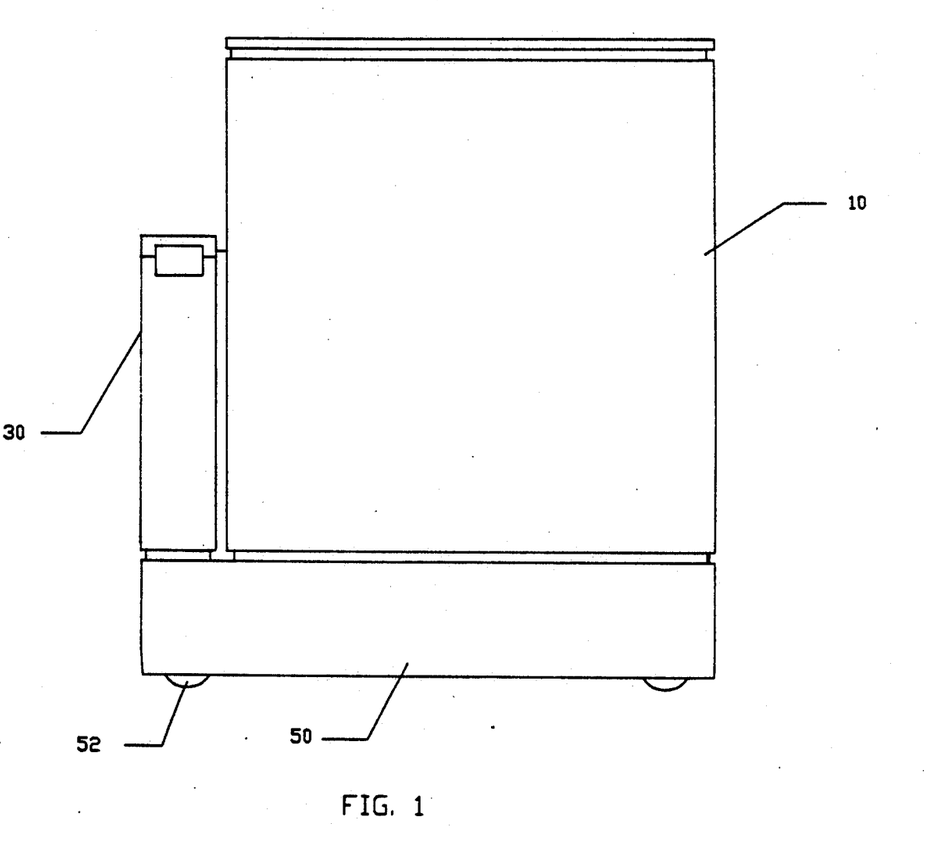
FIG. 1 is a side view of the present invention outlining the modular assembly.

A wheelchair cleaning system embodying the present invention is shown in FIG. 1. The wash chamber 10 and the control unit 30 are supported and mounted on the mobile base 50. Caster wheels 52 provide for mobility. The present invention is constructed of aluminum. This material provides for minimum weight for mobility and removing the wash chamber off the base. Alternatively, construction can be fabricated using stainless steel, plastics and other material based upon operating environment and costs.

Figure 2:
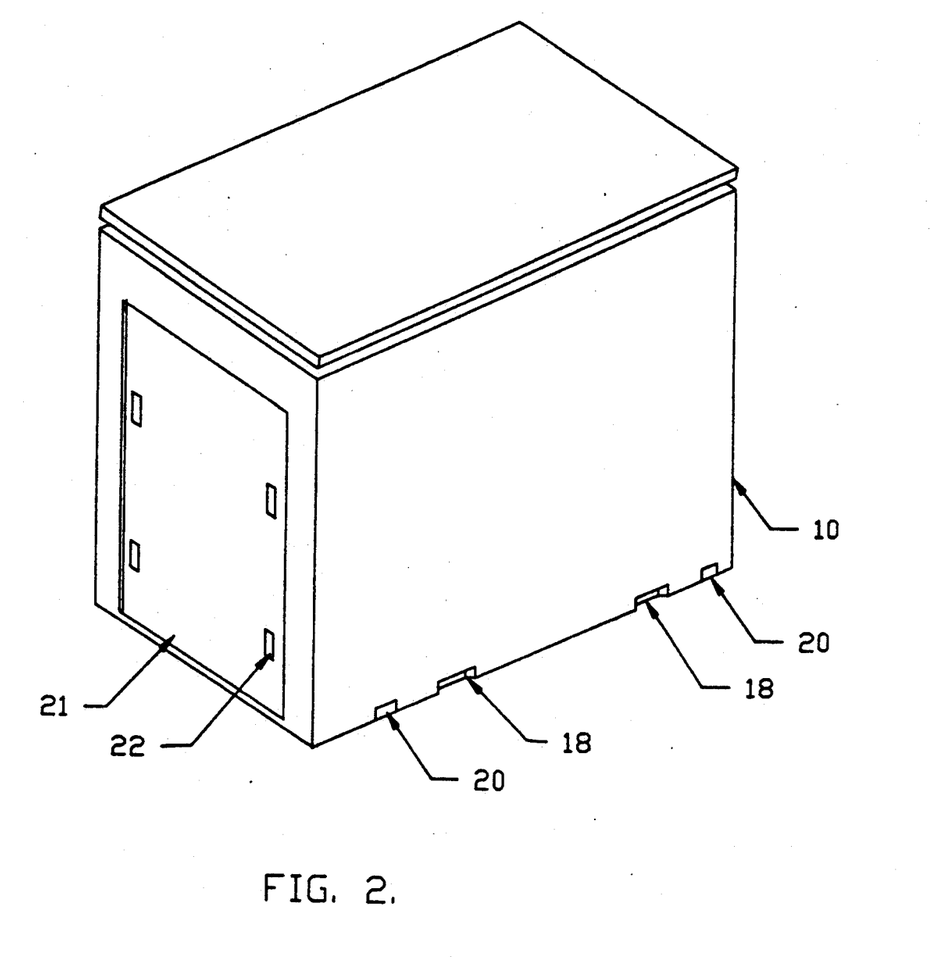
FIG. 2 is a perspective view of the removable wash chamber.

A more detailed view of the wash chamber 10 is shown in FIG. 2. The wash chamber 10 consists of a top and four sides of which one side is the door 21. The bottom is open and when coupled to the mobile base 10 FIG. 1, forms the floor for the equipment to be placed on for cleaning. Dimensions for the wash chamber, designed for wheelchairs, are approximately 47 inches high, 47 inches depth and 36 inches wide.

Figure 5:
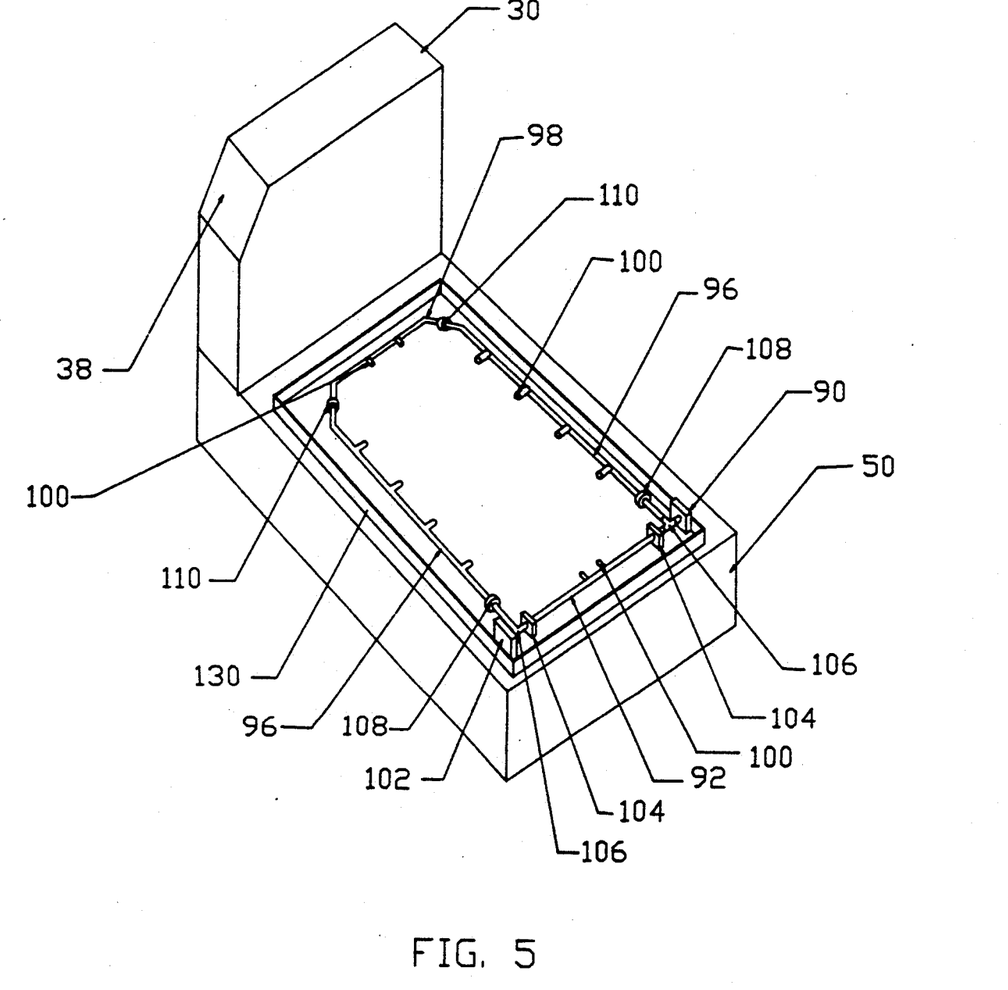
FIG. 5 is a perspective view of the cleaning system with the wash chamber removed showing the operators control unit and the base with the spray arm assembly.
Figure 9:
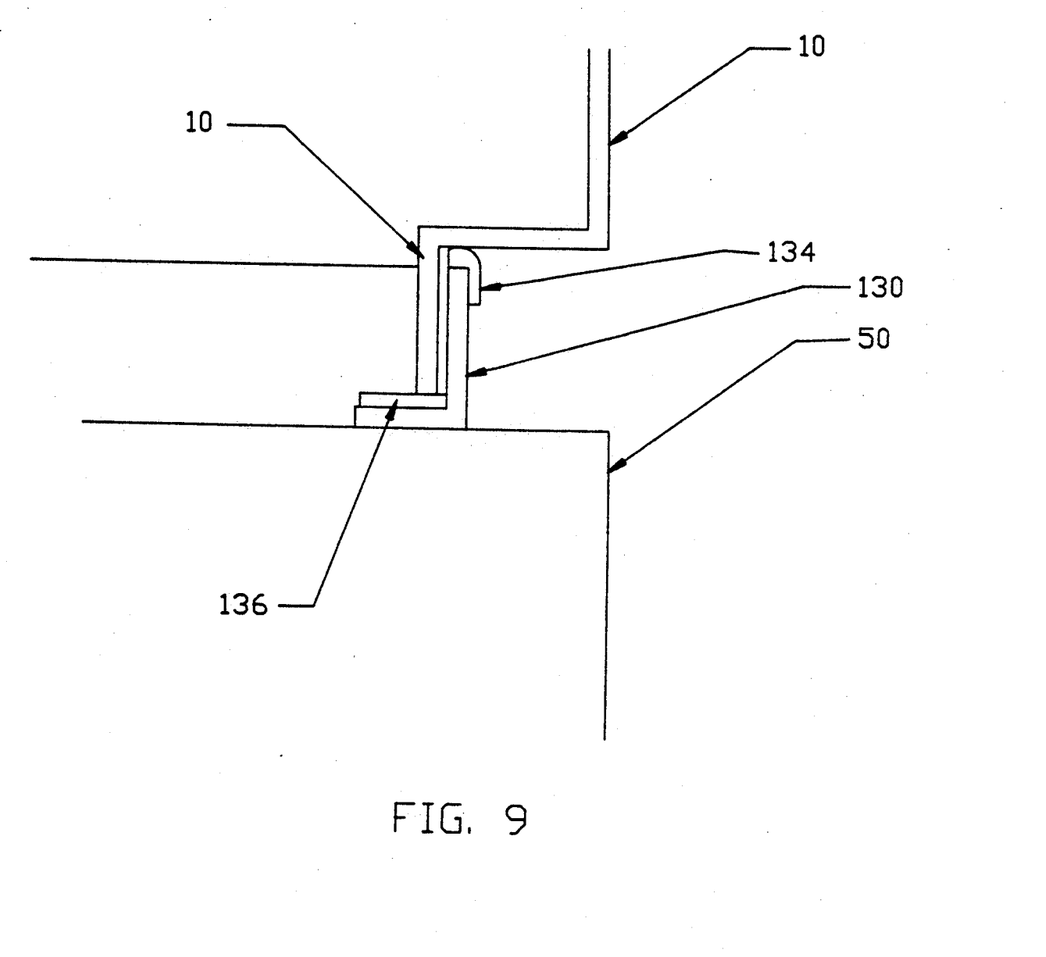
FIG. 9 is an illustrative view of the mobile base coupling design with the removable wash chamber.
Figure 10:
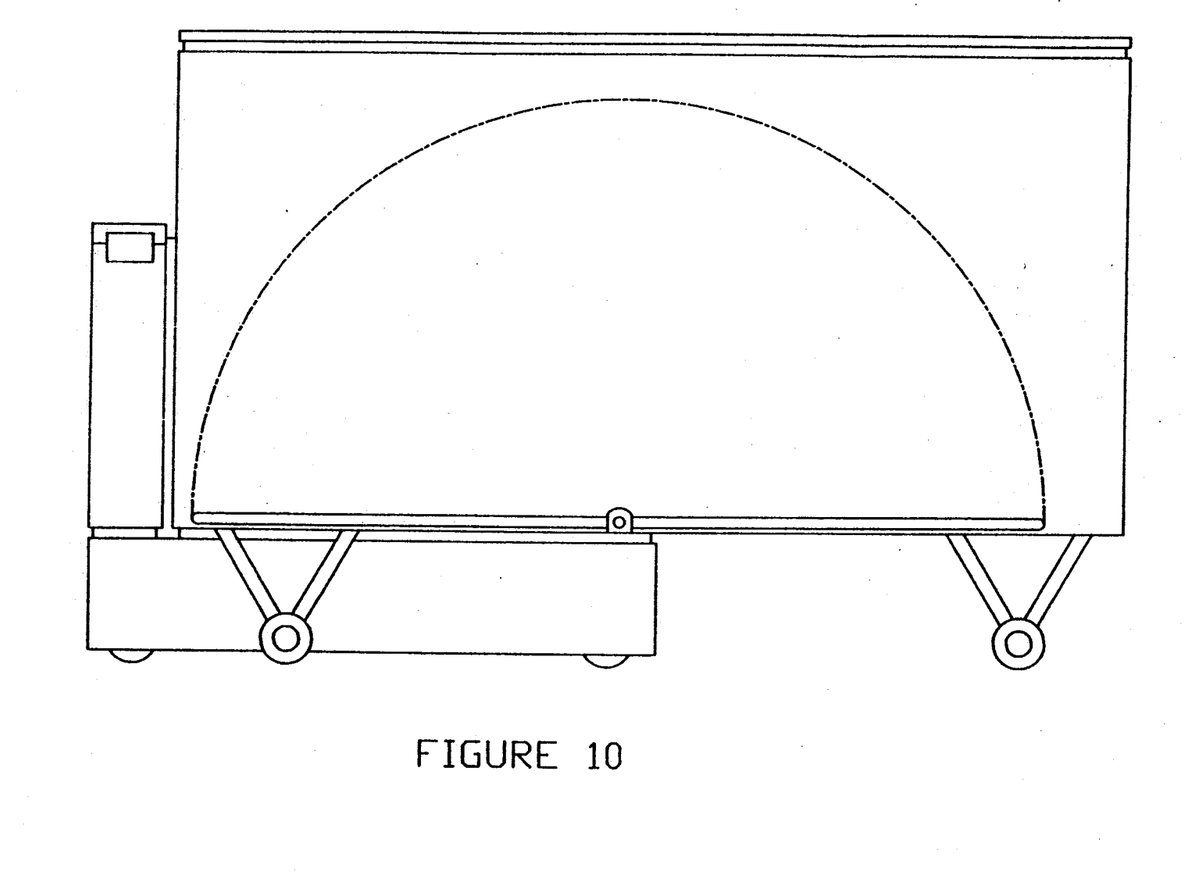
FIG. 10 is an illustrative view of the wash chambers.

To lift the wash chamber 10 and mount it on the mobile base 50 FIG. 1, handles 18 are built into the sides of the wash chamber 10 on all four sides of the mobile base, a raised angle edge 130 shown in FIG. 5 and FIG. 9 provides the means for the wash chamber to fit on the base 50 FIG. 1 inside the raised edge. Alternatively, if other sized wash chambers were to be constructed, it should be understood that the same coupling dimensions would be adhered to. Larger sized wash chambers would be constructed with a floor for those areas that exceed the coupling dimensions.

Compression latches 20 located near the bottom edge of the wash chamber 10 are secured to the base 50 to prevent water leakage by pressing the edges of the wash chamber 10 into a seal 136 shown in FIG. 9 located on the base 50. Additionally, latches provide stability for the wash chamber 10.

The wash chamber's door 21 includes compression latches 22 providing a water tight enclosure when closed against the door seal.

Figure 3:
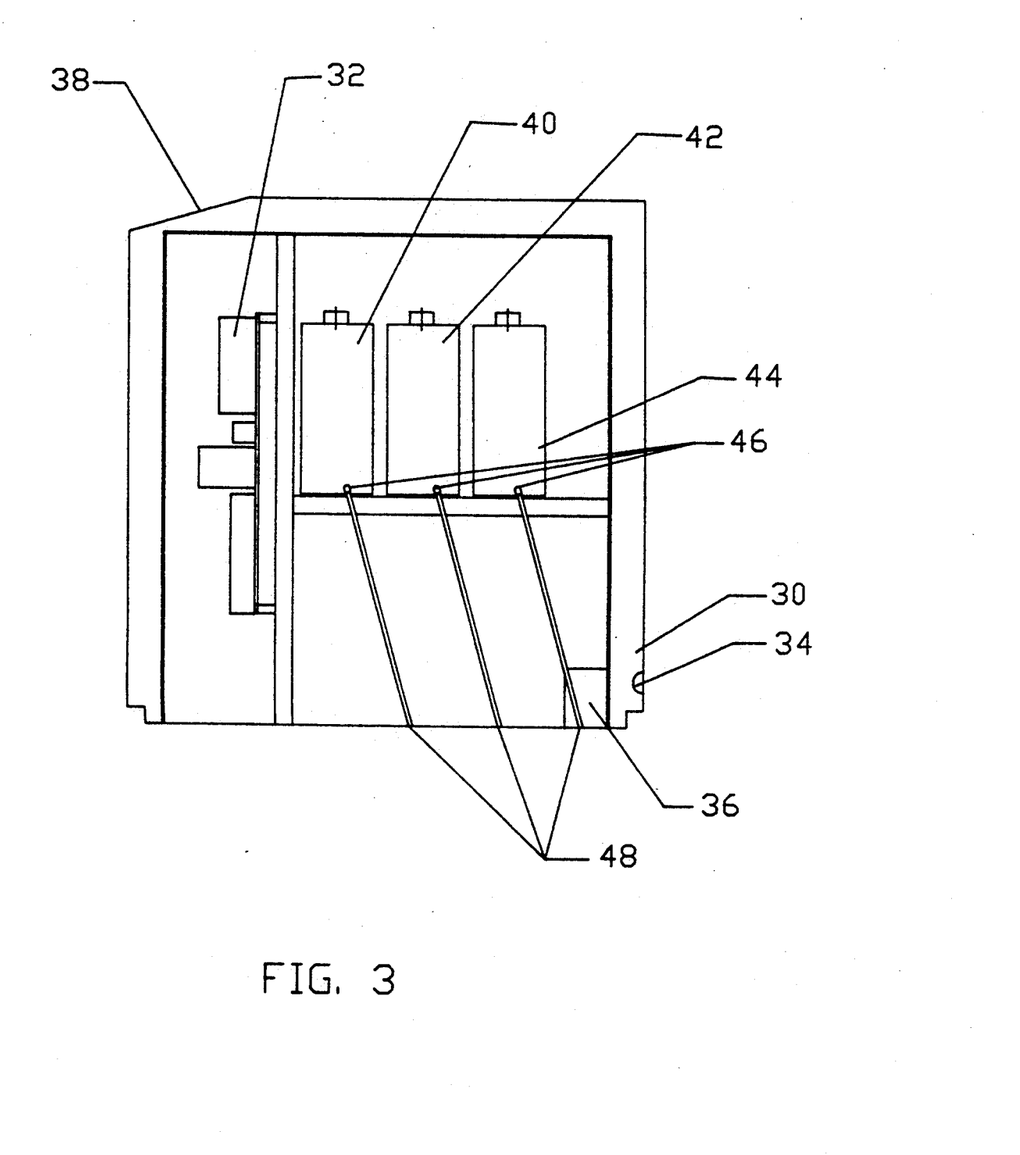
FIG. 3 is a back view of the control unit.

FIG. 3 is a back view of the operators control unit 30 housing the micro-processor 32 and programmable software, the electrical receptacle 34 to supply power, a ground fault receptacle 36, the operators control panel 38 and containers for cleaning detergents 40, disinfectants solution 42 and rinse additives solution 44.

Each of the three containers have a bottom spigot 46 that a tubing line 48 attaches to. Each tubing line 48 connects to a valve 62, 63, 65 shown in FIG. 4. Under program control, a valve will be energized to open and release the concentrated chemical liquid into the sink 56 shown in FIG. 4.

The control panel 38 consists of a four position switch for selected cleaning functions and push button switches for adding disinfectants and rinse additives. Start, stop and problem push button switches are included in the control panel. Alternatively, the control panel may add different switches for enhancements to the wheelchair cleaning process or different size equipment.

Figure 4:
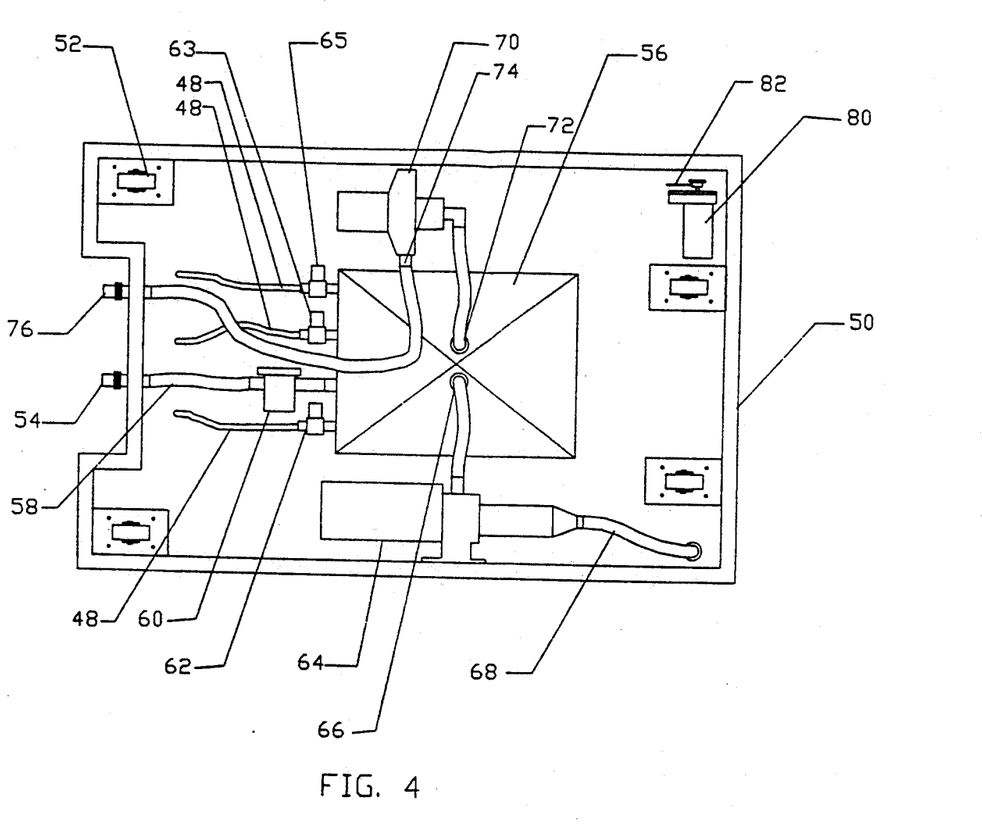
FIG. 4 is an underside view of the mobile base.

The base 50 shown in FIG. 4 contains all of the electromechanical components used in the cleaning process. Caster wheels 52 are located on the front and back for mobility.

Water from the water supply connection 54 enters the sink 56 through the water supply line 58. The solenoid valve 60 under program control will open and release a measured amount of water into the sink 56. Approximately three (3) gallons of water are used for the wash and rinse cycles. During the last rinse cycle, water remains in the sink to be used for the next wash cycle. If disinfectant solution was applied to the wheelchair, water remaining in the sink would be drained out due to the disinfectant solution mixing with the cleaning detergent and creating a high foaming reaction. Once the measured amount of water has been reached determined by the flow level switch ~o0 shown in FIG. 8, the solenoid valve 60 will close.

With water now in the sink 56, a measured amount of detergent stored in the detergent container 40 shown in FIG. 3 will be released into the sink 56 by opening the detergent solenoid valve 62 under program control. The detergent is released into the sink 56 by gravity feed as the detergent container is located higher than the sink. Standard detergents used by general purpose pressure washing equipment or hand cleaning should not be used with the cleaning system due to high foaming. High foaming is due to water pressure, small spray nozzle openings and water passages thereby increasing aeration of the water which substantially decreases pump performance. Very low foaming detergents must be used.

During the rinse cycles, of which there are two, a measured release of disinfectant solution through the disinfectant solenoid valve 63 and/or rinse additive solution through the rinse additive solenoid valve 65 will occur if selected by the operator at the control panel 38 shown in FIG. 3.

The wash pump 64 draws water from the bottom of the sink 66 through a line 68 into the rotary seal housing 90 shown in FIG. 5 for distribution of water into the spray arm assembly and out through spray nozzles to return into the sink 56 for re-circulating the water used in the wash or rinse cycles. A centrifugal booster pump is used as the wash pump 64 to provide pressure washing.

Once the wash or rinse cycles are completed, the drain pump 70 draws water from the bottom of the sink 56 using a different opening 72 out through the drain line 74 and drain connection 76 into a floor or utility sink drain that is adjacent to the unit. A dishwasher pump and motor is used as the drain pump 70 for high flow rate and to accept contaminants such as food remains that have collected on the wheelchair.

In FIG. 5, water from the wash pump 64 FIG. 4 enters the rotary tube seal housing 90 and flows into the distribution tube 92 and splits its flow into the left and right spray arms 96. The flow of water will then cross into the front section 98 of the spray arms 96 (if it is installed).

This water circuit contains several spray nozzles 100 strategically positioned on distribution tube 92, front section 98 and the spray arms 96 to maximize cleaning results. The openings in the nozzles 100 serve as a system release for the water circuit to allow system flow and recirculation.

The distribution tube 92 is a hollow tube which is coupled to the rotary seal housing 90 on one end to provide water distribution through the system.

On the opposing end of the rotary seal housing 90, the distribution tube 92 is closed off and coupled into the gear housing 102. Inside the gear housing 102 is a chain driven gear connected to the gear motor drive 80 shown in FIG. 4. This permits the rotary motion from the gear motor drive 80 to transfer into the spray arm assembly. The distribution tube 92 now serves as a drive shaft, providing rotary motion to the spray arm assembly. The distribution tube 92 is retained axially and radially by two (2) bushings 104. These bushings 104 allow the distribution tube 92 and spray arm assembly to rotate freely.

The distribution tube 92 transfers the rotary motion into the left and right spray arms 96 by means of a tee 106 or rigid coupling located at the base of the left and right spray arm. Slightly upward along the left and right spray arm there is located a removable coupling 108 to allow easy disassembly of the spray arm. At the end of the left and right spray arm, is located another set of removable couplings 110 for the front section.

This front section 98 of the spray arm is made removable to facilitate the installation of other medical type equipment or odd sized appliances to be cleaned which may present interference to the spray arm rotation if the front section 98 is left in place.

Position switches 82 shown in FIG. 4 for the spray arm assembly located on the motor mounting plate provide a signal to the motor controller and microprocessor programmable software. By sensing the shaft position, the switches allow the spray arm to rotate and oscillate through a 90 degree angle.

In another embodiment, such as a larger wash chamber, it may be desirable to rotate through either more or less angle. It should be understood that this angle can be changed by switch locational adjustments.

Shown in FIG. 5 to further increase the understanding of coupling the wash chamber 10 to the base 50 is the raised edge 130, approximately one inch in height. The operators control unit 30 and the control panel 38 is also illustrated.

Figure 6:
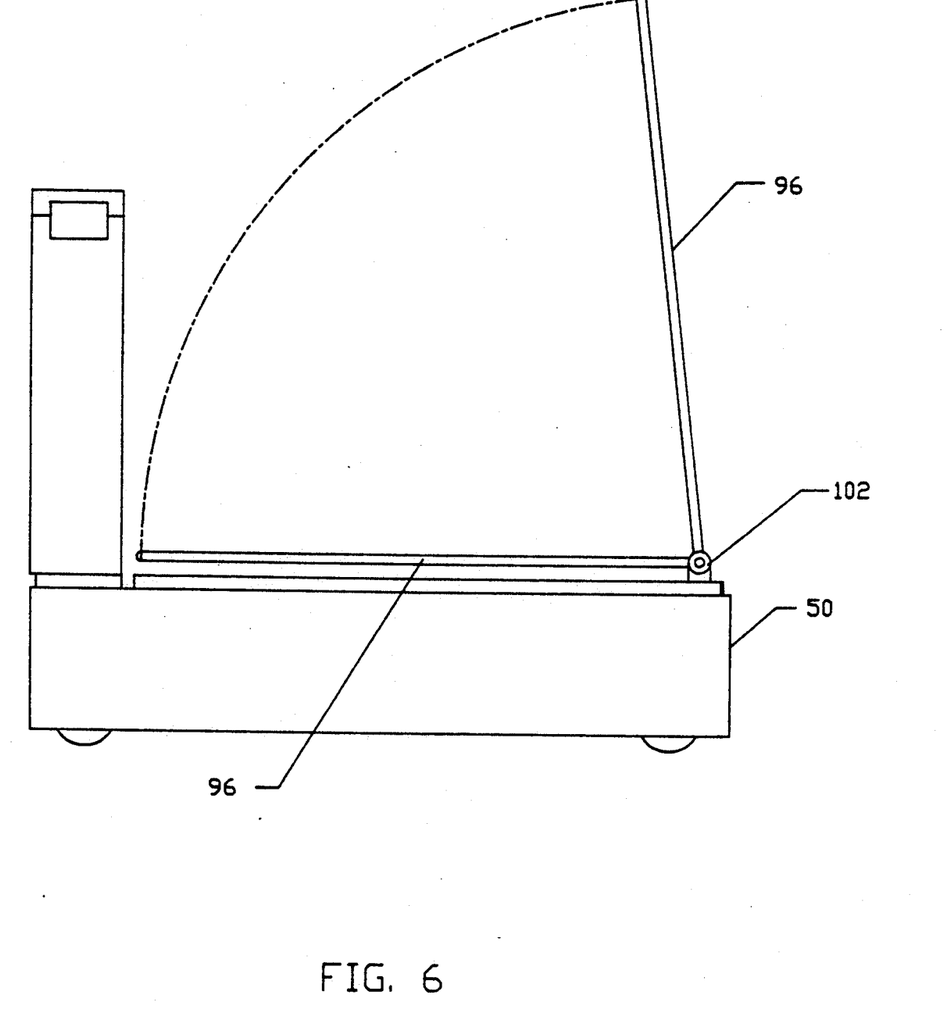
FIG. 6 is an illustrative view of the rotating spray arm assembly on the mobile base.

FIG. 6 shows the rotation of the spray arms 96 on the mobile base 50. The gear inside the gear housing 102 turns the distribution tube that serves as the drive shaft and as part of the spray arm assembly. The spray arm assembly in this embodiment rotates to a 90 degree angle and returns to a horizontal position on the mobile base when in the wash and rinse cleaning cycles. The number of rotations are determined by the wash cycle selected and is also programmable for more or less rotations based upon cleaning needs.

In another embodiment, the spray angle may rotate through a greater angle up to 180 degrees based upon the length of an alternative wash chamber embodiment.

Figure 7:
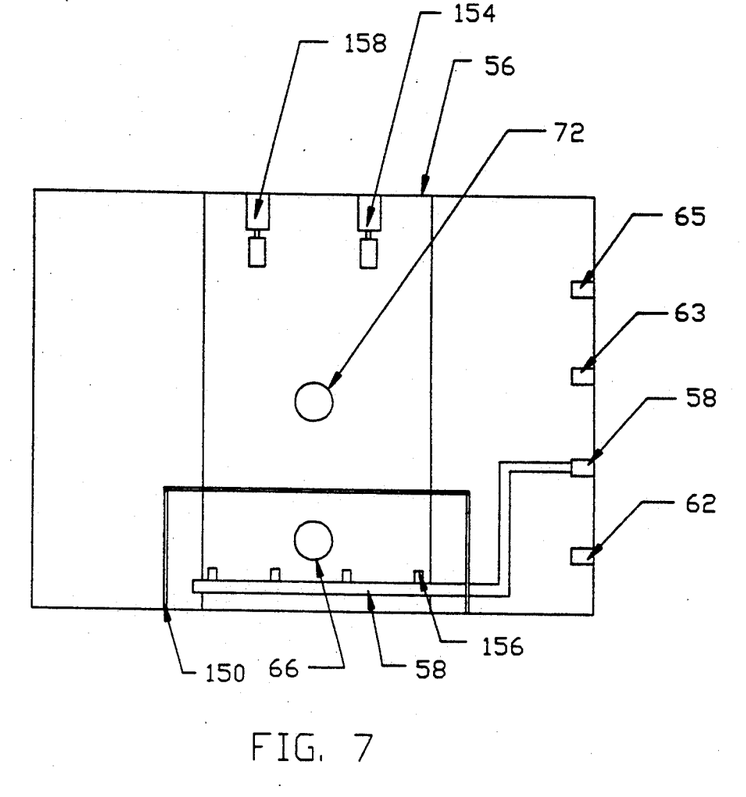
FIG. 7 is a top down view into the sink located in the mobile base.
Figure 8:
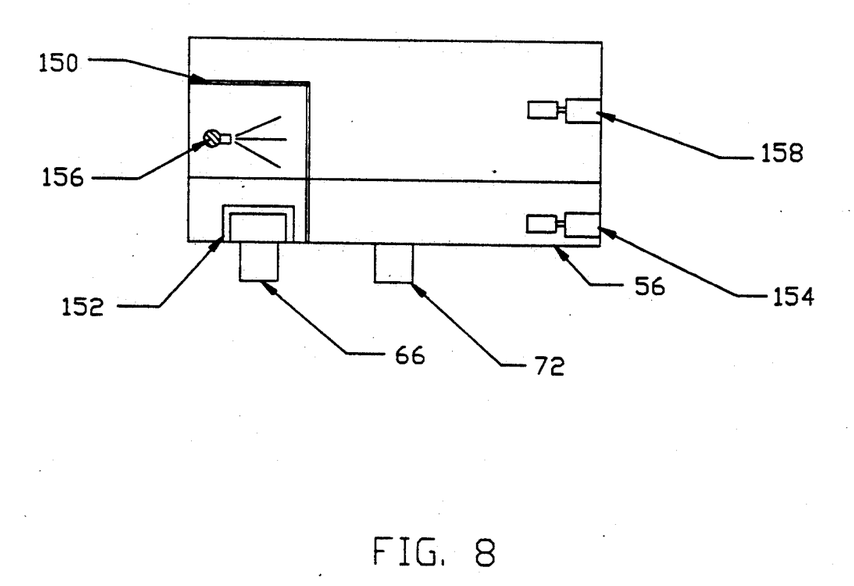
FIG. 8 is a cross sectional view of the sink in the mobile base.

FIG. 7. is a top down view of the sink 56 located in the base 50. FIG. 8 is a cross sectional view of the sink 56 on the base 50. When the wash pump 64 FIG. 4 draws water from the sink opening 66, water flows through a filter screen 150 that encloses the wash pump opening 66. This prevents contaminants and large objects to enter into the centrifugal pump which is not designed for solids and reduces any clogging of the spray nozzles located on the spray arm assembly. As water is drawn into the wash pump 64, a vortex occurs creating an air pocket in the middle of the vortex. This air pocket reduces water flow and pressure for the wash pump. An interference plate 152 is positioned just above the sink opening 66 to break up the swirling motion and by doing so, minimizes the air pocket to maintain maximum pump efficiency.

During the re-circulation of water, contaminants will collect on the filter screen 150 due to the suction force of the wash pump 64. The filter screen 150 covers a large area in the sink to prevent total clogging of the screen 150 for each wash or rinse cycle.

When the cycle is completed, the drain pump 70 FIG. 4 will drain out the water through the drain hole opening 72 and contaminants that are floating in the sink water. Near the end of the drain process determined by a float switch 154 setting for low water, the water supply line 58 will be opened by energizing the valve 60 FIG. 4 to open and spray nozzles 156 that are attached to the water supply line positioned inside the filter 150 will spray against the contaminants on the filter screen 150 and force them off into the sink 56 to be sucked down into the drain 72. This contaminant cleaning of the filter screen 150 occurs for each wash and rinse cycle thereby maintaining minimum operator cleaning of the filter screen.

Illustrated are the openings for the detergent solution 62, disinfectant solution 63 and rinse additive solution 65. The high level float switch 158 is illustrated and signals the valve 60 FIG. 4 to close as the measured amount of water has been reached for wash and rinse cycles.

The sink 56 is designed to slope downwards into the wash 66 and drain 72 openings to increase flow of water for recycling in the wash and rinse cycles.

In FIG. 9 the coupling of the wash chamber 10 and the base 50 is illustrated in detail. The wash chamber 10 edge comes down and across the raised edge 130 and down again onto the seal 136 mounted on the base 50. This coupling design is used for all four sides. On top of the raised edge 130 an additional seal 134 is used to prevent water leakage.

EQUIVALENTS

While this invention has been particularly shown and described with references to preferred embodiments thereof, it will be understood by those skilled in the art that various changes and form and details may be made therein without departing from the spirit and scope of the invention as defined by the dependent claims.

I claim:

1. A mobile washing and disinfecting apparatus having cleaning cycles comprising:
    removable wash chambers, each having a coupling dimension and a substantially enclosed interior region for washing articles of a predetermined size;
    a single base having a complementary coupling dimension for supporting a selected wash chamber and also housing all electromechanical components thereon;
    a re-configurable spray arm movably secured to the base, the spray arm having nozzles for directing a spray of washing and disinfecting fluids upon articles enclosed within the wash chamber and being movable in order to enable the spray arm to move over the articles and maximize the coverage of the spray of washing and disinfecting fluids over multiple surfaces of the articles; and
    a modular programmable microprocessor supported on the base for controlling the cleaning cycles.

2. The cleaning apparatus of claim 1 in which the spray arm comprises:

a first radial arm having proximal and distal ends rotatably attached to the base at the proximal end of the first radial arm, a series of first nozzles positioned along the first arm for directing a spray of wash fluids in a first direction;

a second radial arm spaced apart from the first radial arm having proximal and distal ends rotatably attached to the base at the proximal end of the second radial arm, a series of second nozzles positioned along the second arm facing the first series of nozzles for directing a spray of wash fluids in a second direction.

3. The cleaning apparatus of claim 2 in which the spray arm further comprises:

a connecting arm connecting the first and second radial arms, the connecting arm having a third series of nozzles positioned along the connecting arm for directing a spray of wash fluids in a third direction.

4. The cleaning apparatus of claim 1 further comprising a re-circulating and filtering system which is comprised of a re-circulating pump, a drain pump and a self-cleaning filter arrangement that collects debris on the filter when the re-circulating pump is operating and flushes the debris off the filter and down the drain when the drain pump is operating.

5. The cleaning apparatus of claim 1 in which the apparatus is portable in that the apparatus is light and small enough to be transported by a small vehicle.

6. The cleaning apparatus of claim 1 in which the apparatus is powered by standard household voltage.

7. The cleaning apparatus of claim 6 in which the standard household voltage is 110 volts.

8. The cleaning apparatus of claim 1 wherein the wash chamber, base and spray arm are sized to receive and spray clean a wheelchair.

* * * * *